United States Patent
Bharj et al.

(10) Patent No.: US 6,406,083 B2
(45) Date of Patent: Jun. 18, 2002

(54) FRAME, IN PARTICULAR, FOR TEMPORARY INSTALLATION IN A TRUNK THAT OPENS UP INTO THE PASSENGER COMPARTMENT OF A VEHICLE

(75) Inventors: Ash Bharj, München; Arnulf Frisch; Kai Goldbeck, both of Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/878,105

(22) Filed: Jun. 8, 2001

(30) Foreign Application Priority Data

Jun. 9, 2000 (DE) .......................................... 100 28 735

(51) Int. Cl.$^7$ ................................................ B60N 3/12
(52) U.S. Cl. .................................... 296/37.16; 296/37.1
(58) Field of Search ............................. 296/37.16, 37.5, 296/37.8, 37.18, 37.1, 107.08, 107.11, 107.13; 280/642, 657, 250.1; 182/187; 224/924

(56) References Cited

U.S. PATENT DOCUMENTS

| | | | | |
|---|---|---|---|---|
| 4,073,534 A | * | 2/1978 | Hira | 296/37.16 |
| 4,148,516 A | * | 4/1979 | Gotomyo | 296/37.1 |
| 4,277,097 A | * | 7/1981 | Lalanne | 296/37.16 |
| 4,366,978 A | * | 1/1983 | Hamatani | 296/37.16 |
| 4,443,034 A | * | 4/1984 | Beggs | 296/37.16 |
| 4,473,250 A | * | 9/1984 | Truex et al. | 296/37.16 |
| 4,479,675 A | * | 10/1984 | Zankl | 296/37.16 |
| 4,480,675 A | * | 11/1984 | Berkemeier | 296/37.16 |
| 4,728,141 A | * | 3/1988 | Motozawa et al. | 296/37.16 |
| 4,778,709 A | * | 10/1988 | Abe et al. | 296/37.16 |
| 4,883,302 A | * | 11/1989 | McCain | 296/37.1 |
| 4,969,678 A | * | 11/1990 | Loisel | 296/37.16 |
| 4,991,898 A | * | 2/1991 | Nomura | 296/37.2 |
| 5,224,748 A | * | 7/1993 | Decker et al. | 296/37.16 |
| 5,238,284 A | * | 8/1993 | Whitaker | 296/37.16 |
| 5,492,257 A | * | 2/1996 | Demick | 296/37.16 |
| 5,538,306 A | * | 7/1996 | Ament | 296/37.16 |
| 5,669,537 A | * | 9/1997 | Saleem et al. | 296/37.1 |
| 5,685,592 A | * | 11/1997 | Heinz | 296/37.16 |
| 5,692,792 A | * | 12/1997 | Klar | 296/37.16 |
| 5,970,884 A | * | 10/1999 | Taille et al. | 296/37.16 |
| 6,050,202 A | * | 4/2000 | Thompson | 296/37.16 |
| 6,176,535 B1 | * | 1/2001 | Chaloult et al. | 296/24.1 |
| 6,231,096 B1 | * | 5/2001 | Bollmann et al. | 296/37.16 |
| 6,318,782 B1 | * | 11/2001 | Suzuki et al. | 296/37.16 |

FOREIGN PATENT DOCUMENTS

| | | |
|---|---|---|
| DE | 42 43 192 | 5/1993 |
| DE | 93 13 436 | 12/1993 |
| DE | 298 19 322 | 4/1999 |
| DE | 198 13 751 | 9/1999 |
| DE | 100 07 137 | 8/2000 |
| EP | 0 761 503 | 3/1997 |
| EP | 0 556 100 | 6/1997 |
| JP | 6253261 | * 6/1987 |
| JP | 538980 | * 2/1993 |
| JP | 5170136 | * 7/1993 |

* cited by examiner

*Primary Examiner*—Ken Patel
(74) *Attorney, Agent, or Firm*—Kenyon & Kenyon

(57) ABSTRACT

A frame is for temporary installation in a trunk, which is situated behind the rear seats of a vehicle and opens up into the passenger compartment of this vehicle. In order to horizontally align the frame inside the trunk opening, the size of the frame is adapted to the opening so that the frame encloses the trunk opening as completely as possible. Insert parts may be inserted into the frame as needed. Together with the insert parts placed in the frame, the trunk is horizontally covered in the upward direction. The cover is simultaneously used to partition the trunk into two superposed, separately loadable regions.

19 Claims, 1 Drawing Sheet

FRAME, IN PARTICULAR, FOR TEMPORARY INSTALLATION IN A TRUNK THAT OPENS UP INTO THE PASSENGER COMPARTMENT OF A VEHICLE

FIELD OF THE INVENTION

The present invention relates to a frame. More particularly, the present invention relates to a frame for temporary installation in a trunk that opens into the passenger compartment of a vehicle.

BACKGROUND INFORMATION

In a vehicle having an open trunk, which is situated behind the rear seats and passes over into the passenger 10 compartment, conventional trunk covers merely close the trunk temporarily. In this context, "temporarily closable" should be understood to mean that the covers are removable or that, for example, they are pivoted for loading and unloading the trunk. For example, such trunk covers are described in European Published Patent Application No. 0 556 100, German Published Patent Application No. 298 19 322, German Published Patent Application No. 42 43 192, European Published Patent Application No. 0 761 503, and German Published Patent Application No. 93 13 436. In general, all of these covers are in the form of closed plates or troughs, the troughs being closable at the top. These covers are relatively bulky, and, when they are removed or folded up, they can only be stowed in the trunk in a complicated manner that takes up a large amount of storage space.

It is an object of the present invention to provide a cover for a trunk that is easily and compactly storable in the truck when the cover is not needed or not desired. In the covering position, the cover may form a visibility prevention cover and may be usable as a support or carrier for objects to be laid down in the trunk. The cover may be rigid, and the truck may be loadable on two levels.

SUMMARY

The above and other beneficial objects of the present invention are achieved by providing a frame as described herein.

The present invention is based on the principle of being able to temporarily install a frame in the upwardly pointing opening of the trunk, the frame enclosing the entire opening in order to be able to place variably insertable parts inside the frame. In interaction with each other, the inserted parts should partially or completely cover the trunk, the cover being able to extend at the level of the rear-seat upper edge.

An example of parts that may be inserted into the frame includes removable cases. These cases may be supported directly in the frame, for which purpose snap fasteners or locking fasteners may be provided. However, it is also possible to attach a type of shield or screen having openings to the frame in order to insert parts into openings provided in the screen.

One advantage of the screen that may be used in accordance with the present invention is that it does not need to be self-supporting, but rather it obtains its load-carrying capacity in interaction with the frame. This arrangement allows the screen to be made of one material or made of separate parts, whereby it is possible to fold up or slide the screen material together. In this manner, the volume of the screen may be reduced in the removed state.

The frame itself may be constructed from interconnected parts, which may be moveable relatively to each other in the removed state, so that the volume of the frame may also be reduced in a simple and practical manner.

For example, the side regions of the frame may be releasably attached to the vehicle body inside the trunk. Snap fasteners or locking fasteners, of which many different forms suitable for fastening, may be used. The attachment to the side walls of the body may be accomplished so that the frame may swivel about a front, transverse axis, i.e., about a transverse axis arranged adjacently to the rear seats.

The frame may be attached directly to the rear seats. The frame may, in the storage position, be swung onto the back of the rear seats by folding it down. The arrangement of the rear seats may be such that receiving grooves are provided for storing the frame, i.e., folding the frame down, so that it is also possible for the rear surface of the rear seat to be smooth for the frame being in the folded-down position on the rear seats. If individually collapsible rear seats are provided in a vehicle, then a transverse separating device may be provided so that the frame may be reduced to sizes adapted to the individual rear seats.

In order to achieve the frame function of the present invention, a rod or a bar may be provided at both the rear and front ends of the trunk, in the transverse direction, and the rod or bar may be laterally and detachably supported at the body. The frame function is then provided by the body parts between the pivotal points of the rods. The rod facing the rear seat may also be attached to the rear seat itself instead of to the body.

The through holes in the frame or in a screen inserted into the frame may be covered by elastic material in the direction of the vertical vehicle axis. For example, this material may be in the form of a net.

The stretchable material in the opening of the frame or in the inserted screen may also be supported at the frame or screen in the form of a blind that may be rolled up in order to cover or expose the opening as desired.

DETAILED DESCRIPTION

Figure 1:
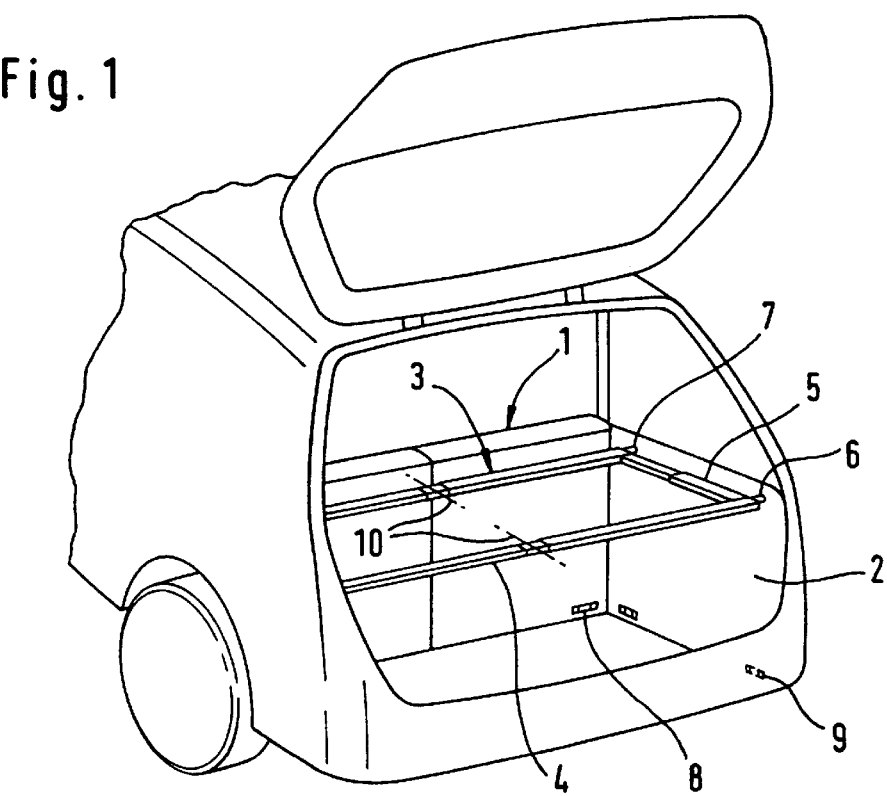
FIG. 1 is a perspective view of an opened trunk of a vehicle.

On the sides of the body shell, an insert in the form of a frame 3 is supported in the upwardly pointing opening of a vehicle trunk 2, which is arranged behind a rear seat 1 of a vehicle and opens up into the passenger compartment.

Frame 3 includes longitudinal rods 4, each of which is telescopic, may be slid into each other, and is aligned transversely to the longitudinal vehicle axis. Frame 3 also includes transverse rods 5, which are arranged in the longitudinal vehicle direction.

Frame 3 is supported on the sides of the body, by snap-fastener-like, detachable supports 6 and 7. Support 7 arranged in front may be a hinged bearing, in order to be able to swing frame 3 down at rear seat 4, for storage purposes.

Supports 7 may also be directly attached to rear seat 1.

If the rear seat 1 is made of separated rear seats, frame 3 may be appropriately split at its longitudinal rods 4. The separation may be achieved by an easily manipulable locking arrangement. In a folded-down position on the back of rear seat 1, the longitudinal bar 4 at the bottom may be fixed in position in a snap-fastener or locking-fastener support 8 attached to rear seat 1.

It is also possible to swing each transverse half of the frame down, in order for them to rest against the sides of the body. The folded frame section may also be fixed in position at a snap or locking fastener 9 on the side of the body.

Frame 3 as a whole may be removed from supports 6 and 7 on the body. In this case, a telescopic design of longitudinal and transverse rods 4 and 5 allows the frame to be reduced in size in a simple manner, for folding it down, e.g., for storage. Hinged bearings 10 may be provided in the middle of longitudinal rod 9, in order that frame 3 may be folded up. Hinged bearings 10 may easily be locked when frame 3 is in the installed state.

Receptacles that project downwardly may be supported in frame 3, when it is installed inside trunk 2 as illustrated in FIG. 1. The size of the receptacles may be set so that the insertion of such receptacles causes the interior space of frame 3 to be completely filled up, in which the lower part of trunk 2 is totally covered. The receptacles may be of variable depth, depending on the storage options desired. The receptacles may be designed as folding bags, which may be pulled out downwardly, in the direction of the vehicle base, in order to increase their receiving volume.

An insertable receptacle may, for example, also be in the form of a cooling box, which may have its own refrigerator operated by the vehicle electrical system or may be powered by an on-board cooling system.

Frame 3 according to the present invention, and receptacles that may be inserted into it, allow trunk 2 to be loaded on two superposed levels, independently of one another.

Figure 2:
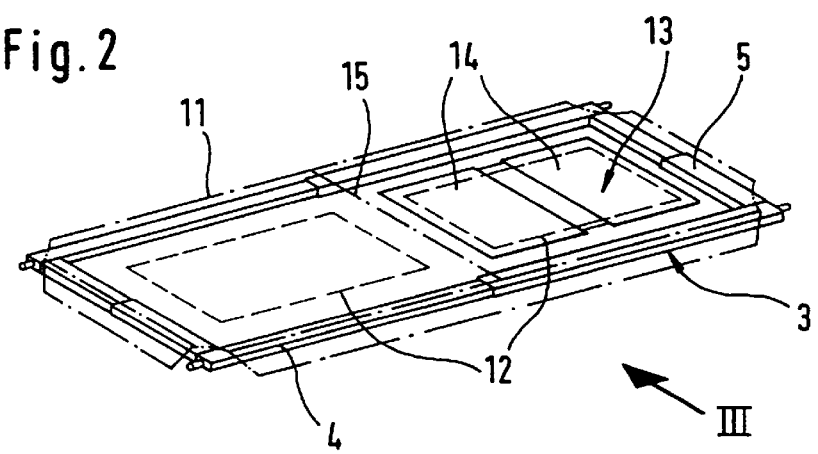
FIG. 2 is a perspective view of a screen for attachment to a frame temporarily supported in the trunk.
Figure 3:
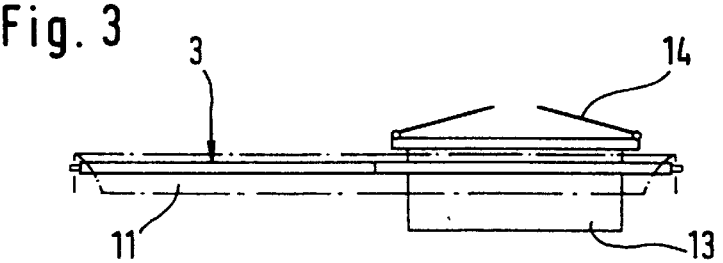
FIG. 3 is a cross-sectional view of the screen illustrated in FIG. 2 in the direction of arrow III.

FIG. 2 illustrates a screen 11, which may be placed on frame 3, may be quickly fastened to it in a locking manner, and includes two openings 12 provided in it. A receptacle 13 is inserted in one of these openings 12. For example, this receptacle 13 may be a case. In the position in which it is inserted into screen 11, receptacle 13 may include lids 14 that may be swung out in the upward direction, the hinge axes being aligned in the longitudinal vehicle direction. Swiveling lid 14 about such swivel axes allows these receptacles 13 to be conveniently used from the passenger compartment.

A region 15 is illustrated between the two openings 12 in screen 11 shown in FIG. 2, it being possible to split screen 11 in this region for stowing reasons. A folding hinge may also be provided in this region in order to fold up screen 11.

Openings 12 in screen 11 may be filled with elastic material, which correspondingly deflects in response to inserting a receptacle 13. This arrangement ensures that screen 11 is opaque, even in the case of openings 12 that are not occupied by receptacles 13.

One example embodiment of screen 11 allows the creation of covers, which may vary in function, in accordance with the desires of the individual user. Thus, e.g., storage boxes may be provided, which are closable by lids and are directly integrated into the screen.

The frame opening may be reduced in size in the longitudinal vehicle direction by sliding together the telescopic guides in transverse rods 5 of frame 3. This arrangement allows the trunk opening to be only partially covered in a region located behind the rear seat bench. Such a scaled-down form of frame 3 only requires that appropriate, additional supports performing the function of support 6 be provided on the sides of the body.

When folding up frame 3 onto the back of rear seat 1 by swiveling the frame into supports 7, in order to attain a loading or stowing position, the frame may be filled in by screen 11. Receptacles 13 inserted in screen 11 may also remain inside the screen. It is possible to easily and handily move a frame 3 filled by a screen 11 from a horizontal working position into a vertical loading or stowing position without having to remove the frame completely. Frame 3 may be folded upward for loading or during the loading of the trunk, while it may be folded downwardly for assuming a stowed position.

What is claimed is:

1. A device for temporary installation in a trunk of a vehicle, comprising:

a frame having a size adapted to a size of an upwardly extending trunk opening, the frame being configured to substantially enclose the trunk opening and being configured to be secured in a substantially horizontal position above a base of the trunk at a body of the vehicle by at least one of supports connected to the vehicle body and rear seats of the vehicle.

2. The device according to claim 1, wherein the trunk is located behind the rear seats of the vehicle.

3. The device according to claim 2, wherein the trunk opens into a passenger compartment of the vehicle.

4. The device according to claim 1, wherein the frame includes an arrangement configured to reduce the size of the frame.

5. The device according to claim 4, wherein the arrangement includes at least one of a folding device, a sliding device and a reversibly detachable connecting device.

6. The device according to claim 1, wherein the device includes an arrangement provided at at least one of the body of the vehicle and the rear seats of the vehicle, the arrangement being configured to at least one of repeatably and temporarily secure a position of the frame and change the position of the frame.

7. The device according to claim 6, wherein the frame is configured to be movable between a plurality of positions in accordance with the arrangement.

8. The device according to claim 7, wherein the arrangement includes swiveling hinges.

9. The device according to claim 6, wherein the arrangement includes at least one of snap fasteners and locking fasteners, the at least one of snap fasteners and locking fasteners being configured to at least one of lock the frame in a position and retain a changed size of the frame.

10. The device according to claim 6, wherein the frame includes at least one through hole, the device further comprising at least one removable receptacle insertable into the at least one through hole.

11. The device according to claim 1, further comprising at least one receptacle insertable into the frame, the at least one receptacle including a hinged lid, the hinged lid being upwardly openable and having a hinge axis extending in a longitudinal vehicle direction.

12. The device according to claim 6, wherein the frame includes an arrangement configured to store the frame in a storage position at a back portion of the rear seats.

13. The device according to claim 6, wherein the frame is configure to be collapsible with the rear seats, at least a part of the frame being foldable on the rear seats.

14. The device according to claim 13, wherein the frame includes an arrangement configured to reversably and detachably separate the frame in regions corresponding to individual collapsible rear seats.

15. The device according to claim 1, further comprising a screen having at least one of an arbitrary through hole and a receiving space, the screen being insertable into the frame.

16. The device according to claim 15, wherein the at least one of an arbitrary through hole and a receiving space is filled with an elastic material.

17. The device according to claim 16, wherein the elastic material includes a net.

18. The device according to claim 1, wherein the frame includes an opening filled with an elastic material.

19. The device according to claim 18, wherein the elastic material includes a net.

* * * * *